Patented July 11, 1933

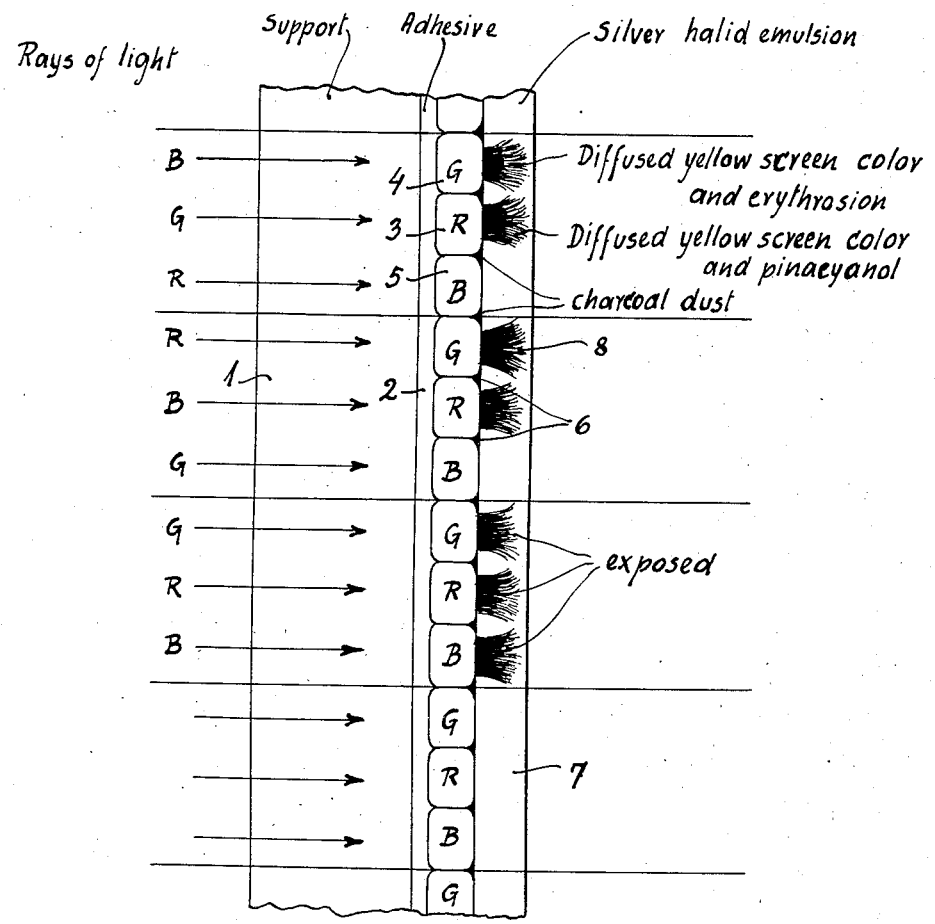

1,918,208

UNITED STATES PATENT OFFICE

WERNER ROBERT BUSCH LARSEN, OF COPENHAGEN, DENMARK

METHOD OF MAKING FILMS FOR NATURAL COLOR RECEPTION

Application filed November 10, 1928, Serial No. 318,598, and in Denmark July 28, 1928.

In making photographic plates, films and the like by using color particles which besides being mixed with a filtering dye, also contain a dye sensitized for the various colors and are applied to a support of glass, celluloid or any other material suitable therefore, it has been found that after a picture has been taken, the photograph has not the capacity of modulation, which is necessary to reproduce the fine details in the subject and which is absolutely imperative for cinematographic purposes.

The reason for this is that the necessarily very small size of the particles of the emulsion contains too few grains of silver halid emulsion to attain the strength required in its chemical deposit. It is therefore of advantage to coat these dyed particles of an emulsion applied beside each other to a support, with a so-called panchromatic silver halid emulsion, which besides being sensitive to the violet light, is also sensitive to green and red light as it is known from the autochrom process and several others which are based on photographing through screens dyed with filtering colors of various forms.

By aid of the methods last mentioned it has been possible to take good natural color photographs, which, however, are not suited for cinematography, chiefly for the reason of the layer of lac used for insulation and protection of the underlying dye screens from the silver halid emulsion and the detrimental influence of the chemicals employed in treating the same. The lac insulation, namely, causes that during the rapid reeling of the film and the heat which is caused by the powerful projector illumination a displacement arises between the fixed position of the color screen and the silver halid emulsion so that the colors of the picture and its sharpness are destroyed. Another great drawback which the plates have, namely that their time of exposure lasts about 60 times as long as that of common bromide plates or films and furthermore renders it impossible to use them for cinematographic films or rapid photographing.

The object of the present invention is to remedy these drawbacks by—in place of employing color screens which during the whole process maintain the color given them from the first, that is the greatest reason for the long exposure required—employing a color screen which does not receive its color strength until a subsequently desired moment, so that the presence of the color screen during the exposure will not delay the latter, which renders it possible to resort to the short exposures which must be used for cinematographic film and instantaneous photographs, and whereby the lac insulation can also be dispensed with. It may also be said that this new method renders it possible to sensitize for each of the color differences employed, contrary to the autochrom process of Lumière, and the other standard processes used, which all employ lac insulation and panchromatic silver halid emulsion, which besides not being able to be tuned exactly, for the same reason also delays the time of exposure.

The preparation of such a color filter with silver halid emulsion coating, which with the chemical action on the part of the color filter is particularly sensitive for red and green light influences without detriment to the original sensitiveness of the emulsion for blue-violet light rays, can be carried out as follows:—100 grammes of gelatine are dissolved in 300 ccs of water, and 100 ccs alcohol added. This quantity dissolved gelatine is then divided into three parts, one part being added to a suitable concentration of a solution of a red dye, for instance acid aniline red, in such a quantity that the warm gelatine solution, when spread out in a very thin layer upon a glass plate, has when looked through a color strength suitable for the usual red color filter. After the color has been added, a suitable quantity of ammonia water or sodium hydrate solution is added until the color solution is diluted to one third of its original strength. Then a silver halid emulsion sensitizer is added, which so far as concerns the red color, may consist of 10 ccs pinacyanol in the ratio of 1:1000. The gelatine colored in this manner is reduced to a fine powder in known manner, for instance by being sprayed with compressed air or by centrifuge. Suitable dyes for the red filter particles are aniline red, brilliant aniline red, acid aniline red, ruby and the like.

To the second part of the gelatine solution a green dye, for instance acid green, is added and the colored material is treated in the same manner as in the preparation of the red filter color and the decolorization must in this case be carried out to a third of the original strength. As sensitizer for the influence of the green light rays on the silver halid emulsion in this case 10 ccs erythrosin solution in the ratio of 1:1000 can be used and the partly decolorized gelatine solution is then reduced to a powder in the above described manner. Suitable dyes are acid green, light green, malachite green, methylene green, brilliant green and the like.

To the third part of the gelatine solution is added a violet dye for example crystal violet in a color strength as mentioned for the red filter. The colored gelatine solution is decolorized to about half its strength by means of alkalies as herein described. No sensitizer is added to the violet color gelatine solution as the silver halid emulsion itself is known to be sensitive to the violet light rays. This gelatine color is powdered as above described. For violet and blue dyes which have proved suitable the following may be mentioned:—aniline blue, pornier blue, cotton blue, acid violet and the above mentioned crystal violet.

As supplementary colors for the red and green gelatine solution may be mentioned: auramin, tratrasin, alizarine yellow, martius yellow and the like.

The three above mentioned comparatively weak colored gelatine powders are well mixed and stuck on a support, which may consist of a glass plate or celluloid film. The securing may be effected in the usual manner by coating the support with a suitable adhesive, for instance gelatine, and thereupon strewing the powder over it, the spaces which may occur between the filter particles being covered by oversprinkling it with finely powdered charcoal. A color filter prepared in this manner with more or less decolorized filter particles, which so far as affects the red and green, contain special sensitizing colors as well as alkalies, is now covered with a usual silver halid emulsion and the following occurs:—The sensitizing colors which are in the color filter particles are diffused into the silver halid emulsion coating, so that this becomes partly sensitive to red and green light rays, in addition to having previously been sensitive for blue violet rays.

In the accompanying drawing a sectional view of a prepared photographic plate is shown by way of example.

1 indicates the carrier, 2 the adhesive layer, and 3, 4 and 5 the decolorized or partly decolorized filter particles, which are held by the adhesive layer and the intermediate spaces filled up by a covering layer 6. The color filter particles 3 and 4 contain red and green dyes and in addition the mentioned sensitizing colors, whilst the color filter particles 5 only contain violet dye. 7 indicates the covering layer of silver halid emulsion over the color filter particles.

During the drying process the sensitizing colors diffuse into the silver halid emulsion layer. 8 indicates the diffusion which occurs from inside towards the outside and less sideways, as the drying of the emulsion layer takes place from the outside. To a part of the color filter particles (or all) certain chemicals which regulate the exposure, such as bromium or alkali salts, can be added during preparation, which chemicals diffuse simultaneously with the sensitizing dyes into the surrounding silver halid emulsion and thereby regulate the light sensitiveness of those parts of the silver halid emulsion which lie next to the filter particles giving off the chemicals.

If the silver halid emulsion layer has not been brought to its maximum light sensitiveness before application this can be remedied by the above mentioned addition of the exposure regulating chemicals to the color filter particles and the emulsion layer be made light sensitive at those places which have also received color sensitizers.

A plate, film or the like prepared in this manner can after exposure be treated in the usual manner, and after developing or fixing can be produced in a suitable color strength by treatment with acids or other chemicals, according to which category the color series employed belong. If certain acid coal tar dyes have been used for coloring the filter particles, decolorization can be effected by the addition of alkalies, such as ammonia, sodium hydrate and the like, whilst recoloring can be undertaken by the action of diluted acids such as nitric acid, acetic acid, sulphuric acid and the like, which, however, all have somewhat varying effects.

I claim:

A method of making film for natural color reception, comprising the steps of applying to one face of a support, having transparent adhesive as backing, partly decolorized color filter particles, which besides their filter colors contain special sensitizing mediums that conform to the filter colors of the separate particles, and over this layer of color particles applying a silver halid emulsion, and after exposure, applying a subsequent chemical treatment to obtain recoloring, all for the purpose described.

In testimony whereof I affix my signature.

WERNER ROBERT BUSCH LARSEN.